(12) United States Patent
Mari (10) Patent No.: US 10,438,456 B2
(45) Date of Patent: Oct. 8, 2019

(54) DEVICE, SYSTEM AND METHOD FOR ISSUING ELECTRONIC RECEIPTS

(71) Applicants: DEEWEE SAS, Cachan (FR); Ruoyun Mari, Cachan (FR)

(72) Inventor: Ruoyun Mari, Cachan (FR)

(73) Assignee: DEEWEE SAS, Cachan (FR)

( * ) Notice: Subject to any disclaimer, the term of this patent is extended or adjusted under 35 U.S.C. 154(b) by 0 days.

(21) Appl. No.: 15/570,548

(22) PCT Filed: May 4, 2016

(86) PCT No.: PCT/FR2016/051053
§ 371 (c)(1),
(2) Date: Oct. 30, 2017

(87) PCT Pub. No.: WO2016/185110
PCT Pub. Date: Nov. 24, 2016

(65) Prior Publication Data
US 2018/0151033 A1 May 31, 2018

(30) Foreign Application Priority Data
May 18, 2015 (FR) .................................... 15 54439

(51) Int. Cl.
*G07G 5/00* (2006.01)
*G06Q 20/04* (2012.01)
(Continued)

(52) U.S. Cl.
CPC ........... *G07G 5/00* (2013.01); *G06Q 20/0453* (2013.01); *G06Q 20/202* (2013.01); *G06Q 20/209* (2013.01); *G06Q 20/3278* (2013.01)

(58) Field of Classification Search
CPC ...... G07G 5/00; G06Q 20/202; G06Q 20/209; G06Q 20/0453; G06Q 20/3278
See application file for complete search history.

(56) References Cited

U.S. PATENT DOCUMENTS 5,739,512 A * 4/1998 Tognazzini ........ G06Q 20/0453
235/380
9,978,039 B1 5/2018 Sharma
(Continued)

FOREIGN PATENT DOCUMENTS

FR    2 968 882 A1    6/2012
FR    2 982 389 A1    5/2013
(Continued)

OTHER PUBLICATIONS

Translation of KR20130013941. Generated Oct. 31, 2018.*
(Continued)

*Primary Examiner* — Nathan A Mitchell
(74) *Attorney, Agent, or Firm* — Young & Thompson (57) ABSTRACT

Disclosed is a device, a method and a system for issuing real-time receipts, the device being connected to a point-of-sale terminal sending it a command to print data representative of the receipt. The device is further connected to a printer, in such a way as to allow the command to print the data representative of the receipt to be transferred to the printer. The device makes it possible to convert the data representative of the receipt, originating from the point-of-sale terminal, into a digital file representative of the receipt. The device then transmits the digital file representative of the receipt, previously associated with an identification number, to a remote storage network accessible via a mobile telephone network of a mobile terminal with which it communicates according to a contactless communication protocol.

11 Claims, 3 Drawing Sheets

(51) Int. Cl.
*G06Q 20/32* (2012.01)
*G06Q 20/20* (2012.01)

(56) References Cited

U.S. PATENT DOCUMENTS

| | | | |
|---|---|---|---|
| 2003/0055733 A1 | 3/2003 | Marshall et al. | |
| 2003/0126020 A1* | 7/2003 | Smith | G06Q 20/02 705/21 |
| 2004/0225567 A1* | 11/2004 | Mitchell | G06Q 20/0453 705/16 |
| 2012/0084391 A1* | 4/2012 | Patel | G06Q 20/0453 709/217 |
| 2012/0185306 A1* | 7/2012 | Cheng | G06Q 20/209 705/14.4 |
| 2012/0316950 A1* | 12/2012 | LaPorte | G06Q 20/3221 705/14.33 |
| 2015/0025986 A1* | 1/2015 | Patel | G06O 30/0207 705/16 |
| 2015/0142593 A1* | 5/2015 | Chauhan | G06Q 20/202 705/21 |
| 2015/0193752 A1* | 7/2015 | Simpson | G06Q 20/20 705/16 |
| 2015/0254633 A1* | 9/2015 | Nishizawa | G07G 5/00 705/24 |
| 2015/0262157 A1* | 9/2015 | Chihara | G07G 1/00 705/21 |
| 2015/0356549 A1* | 12/2015 | Patel | G06Q 20/0453 705/21 |
| 2016/0196538 A1* | 7/2016 | Mori | G06O 20/0453 705/16 |
| 2016/0267456 A1* | 9/2016 | Serizawa | G06Q 20/209 |
| 2018/0225653 A1* | 8/2018 | Vokes | G06F 21/577 |

FOREIGN PATENT DOCUMENTS

| | | |
|---|---|---|
| KR | 2013 0013941 A | 2/2013 |
| WO | 2012/099752 A2 | 7/2012 |
| WO | 2014/008061 A1 | 1/2014 |

OTHER PUBLICATIONS

Translation of FR2968882. Generated Oct. 31, 2018.*
International Search Report, dated Aug. 17, 2016, from corresponding PCT/FR2016/051053 application.

* cited by examiner

DEVICE, SYSTEM AND METHOD FOR ISSUING ELECTRONIC RECEIPTS

FIELD OF THE INVENTION

The invention relates to the dematerialization of sales slips, also called receipts. The invention more particularly relates to a method and device for dematerializing a receipt in real time, during payment by a customer at checkout. It also relates to a system for dematerializing receipts comprising a remote storage network for storing the digital receipts generated by said dematerialization device.

Irrespectively, when a purchase is made it is usual for the checkout assistant to issue a receipt. These receipts are often thrown away immediately after checkout or some time after. Similarly, discount coupons, issued at the time of promotions, are rarely used as they often go missing or are lost. Receipts and the discount coupons are therefore a considerable waste of paper.

Apart from wasting paper, printed receipts have other highly inconvenient disadvantages for customers.

In fact, dematerialized receipts often serve as warranty cards for household appliances or implements, for example. But customers often have trouble in finding them again as they generally have not put them away correctly. Also, printers of receipts are generally thermal printers which do not allow for dematerialized receipts to be kept long-term. Receipts do not survive well in conditions when exposed to humidity and solar radiation. The service life of receipts is therefore limited and generally much shorter than the life of a warranty. It varies essentially according to the quality of the paper used. For long-term preservation of a warranty card, the customer is therefore generally obliged to photocopy and/or scan the receipt.

Nor is classifying these receipts easy when they accumulate and have to be kept so that expense reports may be proven or expenses may be verified for example.

Finally, the thermal paper of receipts contains Bisphenol A, a chemical substance known as an endocrine disruptor which should be therefore eliminated.

There is therefore an ecological, economic, practical and public health interest in avoiding the printing of receipts on paper.

PRIOR ART

Solutions for dematerializing receipts have already been studied, but to date they have failed to provide complete satisfaction.

A first solution, described in document FR2 968 882 consists of sending the receipt in the form of e-mail to one or more email addresses, and/or in the form of an SMS to a cell phone number. For this, the customer must previously have registered with the web site of the store proposing such a dematerialization service to register the email addresses and/or telephone number of his/her choice. When he/she registers on the web site, a unique identification number is attributed to the customer by the store brand. As the customer passes through checkout, the checkout assistant asks for his/her identifier and choice of printing, i.e., if he/she wants the receipt to be printed on paper or if he/she wants to receive it at his/her previously recorded e-mail address (es). If the customer wants to receive it at his/her e-mail address, the checkout assistant actions an issuing order for the receipt to go to this address. This solution therefore involves the checkout being connected to the Internet network, either directly or by way of a server in the store, to issue the receipt. But to date checkouts are generally not connected. This solution is similar to a system for managing loyalty cards associated with a particular brand and is still complex to run. In fact, it requires prior registration with the service and attribution of a client identification number for each brand proposing such a dematerialization service. Now, a customer is not going to register in advance with a large number of sites managed by different brands. He/she may register with the sites of two or three brands which he/she visits frequently, so that he/she has to keep two or three identification numbers, associated with his/her loyalty cards. Therefore, he/she could not access the service for dematerializing receipts in those stores he/she visits occasionally or in restaurants for example, which do not offer this type of loyalty service unless they are part of a chain. Also, if it is possible to set up a server for attribution of identifiers for large stores, such as mass distribution stores for example, it is much more difficult to set up such a server for small boutiques or restaurants. This solution also requires extra effort on the part of the checkout assistant who must ask the customer two more questions, as he/she has to ask for and/or scan the identifier number of the client and ask him/her to choose virtual or paper printing.

A second solution, described in patent applications WO2012/099752 and WO2014/008061, consists of attaching a checkout, also called point-of-sale (POS) terminal, both to a peripheral capable of transcribing the receipt into a digital receipt and also to a physical printer for printing the receipt on paper. But this solution needs to modify the POS terminal by integrating software capable of administrating transfer of the receipt either to the printer which is connected to it or to the peripheral to transcribe the receipt into a corresponding digital receipt. The peripheral then transmits the generated digital receipt to a cell phone via short-range wireless communication. As the customer passes through checkout, the checkout assistant must ask him/her for his/her choice of printing, paper or electronic. This solution also remains complex and costly to perform. In fact, it needs adaptation of all POS terminals, constituting considerable cost in setting up the solution. It also needs extra effort on the part of the checkout assistant who has to ask the customer for his/her choice of printing of the receipt. As a function of choice, the checkout assistant must action a corresponding command to activate virtual printing to a cell phone or physical printing on paper.

Document FR2 982 389, as such, describes a method and a system for archiving data contained in a document to be printed. For this, equipment for transmission of sales slips may be disposed between the POS terminal and the printer. This system however needs adaptation of the POS terminal via installation of a virtual printing control. Such adaptation of all POS terminals represents considerable extra cost in setting up such a solution.

Existing solutions are therefore relatively complex to carry out and/or too costly to be able to be deployed extensively both in department stores and in small boutiques or restaurants, for example.

Technical Problem

The aim of the invention is therefore to rectify at least one of the disadvantages of the prior art. The invention aims especially at proposing an alternative device which is simple and inexpensive for dematerializing receipts in real time, when a customer passes through checkout, and which enables fully transparent dematerialization relative to a checkout assistant. Such a device must also avoid any modification or adaptation of the POS terminal.

Another aim of the invention consists of proposing a dematerialization system comprising a remote storage network to which the digital receipts generated by the dematerialization device are transferred.

Digital receipts stored in the remote storage network must also be capable of being easily accessible and displayed on the screen of any terminal.

BRIEF DESCRIPTION OF THE INVENTION

For this purpose, the invention relates to a device for dematerializing a receipt in real time, said device being connected between a point-of-sale (POS) terminal giving it an order for printing data representative of said receipt, and a printer, so as to enable transfer of said print order of said data representative of the receipt to said printer, said device being characterized in that it comprises a conversion module suitable for converting said data representative of the receipt, coming from said POS terminal, into a digital file representative of said receipt, and a contactless transmitting/receiving module suitable for exchanging data with a communicating object according to a contactless communication protocol, said communicating object being in the form of an electronic tag or a mobile terminal, and in that the transmitting/receiving module is suitable for transmitting one or more digital files generated by said conversion module, each file being associated with a unique identifier, to a remote storage network accessible by means of a mobile telephone network of a mobile terminal, which acts as a gateway and with which said module communicates according to said contactless communication protocol.

Accordingly, when the customer presents a communicating object to the dematerialization device, the device transfers the digital file which it has generated to a storage network by means of a mobile telephone network of a mobile terminal with which it communicates according to a contactless communication protocol. By comparison, when the device detects no presence of a communicating object, it directly transfers the data representative of the receipt to the printer for paper printing. The device therefore enables dematerialization of the receipt or not, at the choice of the customer, and fully transparently for the checkout assistant who needs to take no extra action. Also, the device is disposed between the POS terminal and the printer and plays the role of intermediary such that the POS terminal needs no particular adaptation.

According to other optional features of the device:
it comprises a first storage means of the data representative of the receipt, issued by the POS terminal,
it further comprises a second storage means for recording one or more digital files, representative of one or more receipts, waiting to be transferred to said remote storage network (200), each digital file being attached to an identification number transmitted by said communicating object to said dematerialization device according to said contactless communication protocol,
it further comprises an actuation button of a print command on paper, to issue a print order of the data representative of the receipt, coming from said POS terminal, to the printer which is connected to it,
it further comprises an on-board peripheral suitable for indicating the state of conversion of the data representative of the receipt into a digital file, said peripheral being selected from at least one of the following peripherals: a screen and/or one or more indicator lights.

The invention further relates to a method for dematerializing a receipt issued by a POS terminal to a dematerialization device such as described hereinabove, characterized in that it comprises the following steps: transfer of the data representative of the receipt, generated by the POS terminal, to said dematerialization device; conversion of said transferred data into a digital file representative of said receipt; then:

a1) detection of the presence of a communicating object with which the dematerialization device may exchange data according to a contactless communication protocol, said communicating object being in the form of an electronic tag or a mobile terminal, a2) reading, by the dematerialization device, of a unique identification number transmitted by said communicating object, a3) associating said read identification number with said generated digital file, a4) transferring said digital file representative of said receipt to a remote storage network accessible by means of a mobile telephone network, which acts as a gateway and with which said device communicates according to said contactless communication protocol;

or:

b) in the absence of detection of a communicating object and/or on activation of a print command: transferring said data representative of said receipt coming from said POS terminal to a printer connected to said dematerialization device for printing said receipt on paper.

According to other optional features of the method:
prior to or simultaneously with the conversion step, said data representative of said receipt issued by the POS terminal is recorded in a first storage means of said dematerialization device,
the contactless communication protocol is preferably the NFC protocol,
when the identification number is transmitted by an electronic tag, the digital file associated with said identification number is recorded in a second storage means, while waiting for its transfer at the time of subsequent detection of the presence of a mobile terminal suitable for accessing said remote storage network by means of its mobile telephone network,
when several digital files are transferred from said second storage means to the remote storage network, by means of the mobile telephone network of a mobile terminal, which acts as a gateway and with which said device communicates according to said contactless communication protocol, a server of said remote storage network identifies them by way of their associated identification number, separates them and stores them in a database,
the method further comprises incrementation of a timeout until a predetermined maximum duration, on expiration of which, if the dematerialization device detects no presence of a communicating object for reading the identification number to be attached to the generated digital file, it sends a print command to the printer to print the receipt on paper.

The invention finally relates to a dematerialization system characterized in that it comprises: a dematerialization device such as described hereinabove suitable for converting data representative of a receipt, issued by a POS terminal, into a digital file representative of said receipt; and a remote storage network accessible by means of a mobile telephone network of a mobile terminal, which acts as a gateway and with which said dematerialization device communicates according to a contactless communication protocol, to transfer said generated digital file to said remote storage network.

According to other optional features of the system:
- the remote storage network comprises a server connected to one or more databases capable of storing unique identification numbers attributed to anonymous users, and digital files representative of receipts, each file being associated with an identification number,
- the database(s) further store one or more e-mail addresses associated with an identification number,
- the remote storage network further comprises a module operating the data stored in the database(s) to analyze the consumption habits associated with each unique identifier and allow the issuance of targeted, as a function of said consumption habits, to said identification numbers, said offers being viewed on the screen of a mobile terminal loaded with a dedicated software application associated with said identification number and/or sent via e-mail, if an e-mail address is associated with said identification number.

Other particular features and advantages of the invention will emerge from the description given by way of illustrating and non-limiting example, in reference to the appended figures, in which.

DETAILED DESCRIPTION OF THE INVENTION

Throughout the description, "receipt" means any support, physical or digital, comprising data relative to a transaction. A receipt may therefore correspond to a sales slip, or to a payment receipt by payment card when the checkout payment is made by this means, or to any other equivalent ticket. A receipt comprises a list of information associated with the transaction, such as for example the name of the bought article and the quantity and price, the date and time of the purchase, the name of the store and possibly the name of the checkout assistant at the time of issuing of the receipt.

Throughout the description "checkout" or "POS terminal" are used variously to designate the terminal inputting the bought articles and the setting up of lines of data representative of the receipt to be printed physically or converted digitally.

Figure 1:
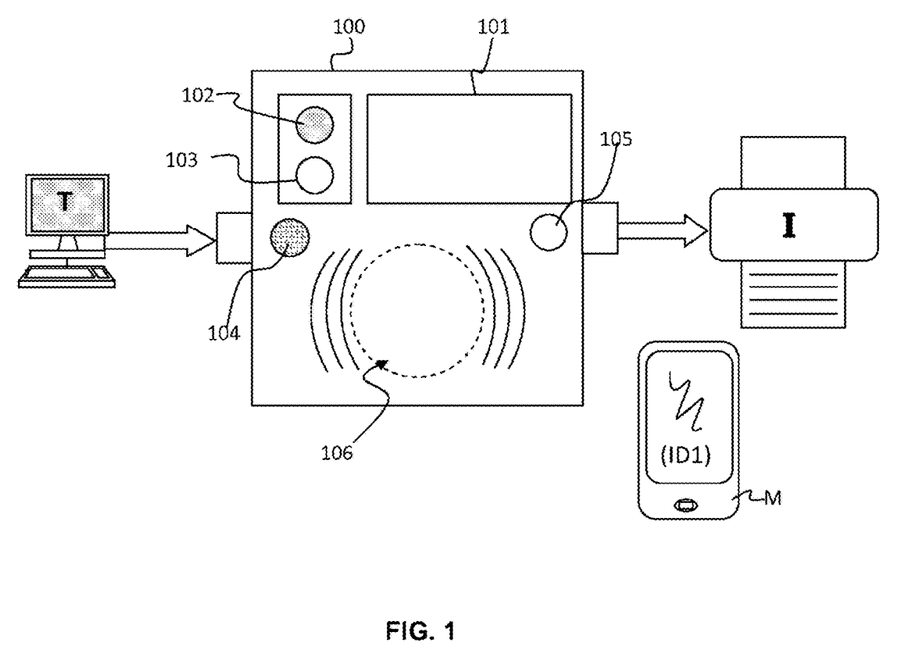
FIG. 1 shows a diagram of a device for dematerializing receipts according to the invention.

FIG. 1 illustrates a diagram of a device 100 according to the invention, for dematerializing receipts issued by a POS terminal reference "T". Classically, such a terminal T is connected to a printer referenced "I", intended to print the receipts it generates.

By way of advantage the device 100 for dematerializing receipts according to the invention is disposed between the terminal T, generating the data representative of the receipt, and the printer I. The terminal T is therefore no longer connected directly to the printer I as has been the case to date, but it is connected to the dematerialization device 100, in turn connected to the printer I. The dematerialization device 100 then constitutes a proxy device since it plays the role of intermediary between the POS terminal T and the printer I. The device 100 may then be powered electrically either by the power coming from the POS terminal T or by an autonomous device, for example.

In this case, the device 100 is seen by the POS terminal T as a simple printer. The data generated by the POS terminal T, representative of the receipt to be printed, are sent by the POS terminal T to the device 100 with a print order.

The dematerialization device 100 is capable both of transferring the data representative of the receipt issued by the POS terminal T to the printer I and also of converting the data representative of the receipt into a digital file compatible with a contactless communication protocol to enable their transfer to a storage means or a remote storage network. For this, when passing through checkout a customer may make his/her choice for receiving a conventional receipt printed on paper, or a digital receipt.

So, if the customer decides to receive a receipt printed on paper, he/she presses a button 105 of the device 100, which triggers a print command of the receipt on paper. In this case, the dematerialization device 100 receiving the order to print the receipt on paper transfers the data representative of the receipt, issued by the POS terminal T, to the printer I.

However, when the customer wants to receive the receipt in digital form, it may have a communicating object capable of exchanging data with the dematerialization device 100 via a short-range contactless communication protocol. The communicating object may for example be an electronic tag, comprising an RFID chip for example, or a mobile terminal M. The mobile terminal M may for example be a cell phone, more currently called "smartphone", or a digital tablet or any other equivalent terminal, connected to a mobile telephone network.

So that it may exchange data with the communicating object, according to a short-range contactless communication protocol, the dematerialization device 100 is advantageously provided with a transmitter/receiver module comprising an on-board antenna shown in dotted lines and referenced 106 in FIG. 1. The communicating object is similarly provided with a transmitter/receiver having the same technology.

The short-range contactless communication protocol, enabling the dematerialization device 100 to exchange data with the communicating object, may for example be a protocol of Near Field Communication (NFC) or Bluetooth type, well known to the skilled person. It may also be implemented in the form of ultrasound emission, or any other device for near-field data transfer. The communication protocol is preferably NFC protocol with a reading distance of up to 5 cm. The device further has anti-collision functionality so that it may read a single communicating object only, equipped with NFC technology, at the same time.

The dematerialization device 100 initially converts the data representative of the receipt, coming from the POS terminal T, into a digital file representative of said receipt.

The dematerialization device 100 advantageously comprises on-board peripherals such as a screen 101, such as for example a liquid crystal display LCD, for displaying messages to the customer, and/or indicator lights, such as light-emitting diodes LED 102, 103, of different colors, to indicate the status of the device and especially whether it is ready to transfer a digital receipt or not.

So, by way of the screen 101 and/or the indicator lights 102, 103, the customer knows the status of the device 100, and especially whether it is ready to transfer a digital receipt or not. In fact, as long as all the data representative of the receipt have not been converted, the dematerialization device 100 displays a wait message on the screen 101, such as the "wait" message for example and/or lights up an indicator light, steady or blinking, such as a red LED 102 for example. Then, once the data are converted, the device displays a message on the screen 101 according to which it is ready to transfer the receipt. This message may for example be the following message "present your terminal or press the button for paper printing". In this case, the device may further extinguish the first indicator light 102 and light up a second one of another color, for example a green LED 103, to signal to the customer that it is ready.

The dematerialization device 100 may further comprise a beeper 104 (more commonly called "buzzer"), for transmitting a sound signal once it detects and/or no longer detects the presence, in its communication field, of a communicating object fitted with compatible technology with its short-range contactless communication protocol.

In the embodiment illustrated in FIG. 1, the customer presents his/her mobile terminal M, which he/she has previously loaded with a software application dedicated to receipts. The mobile terminal M sends the dematerialization device 100 a signal comprising a unique identifier ID1 associated with the application loaded in the terminal M.

The device 100 receiving this unique identifier ID1 attaches it to the digital receipt which it has just generated then transfers said receipt attached to its identifier ID1 to the mobile terminal M, via the short-range contactless communication protocol, such as NFC protocol for example. The dedicated software application of the mobile terminal M then immediately transfers the receipt to a remote storage network, better known as "cloud", by means of the mobile telephone network of the mobile terminal M, governed by GSM standards. The software application loaded in the mobile terminal M may further retain a copy of the most recent receipts in memory in the mobile terminal M, for example the receipts of the current month.

When the customer wants to consult his/her receipts, he/she therefore connects to the remote storage network by means of his/her software application associated with a unique and anonymous identifier number ID1. In this way, at his/her leisure he/she may find his/her warranty cards or expense reports for example and he/she may also classify them according to criteria he/she was careful to parameterize.

Figure 2:
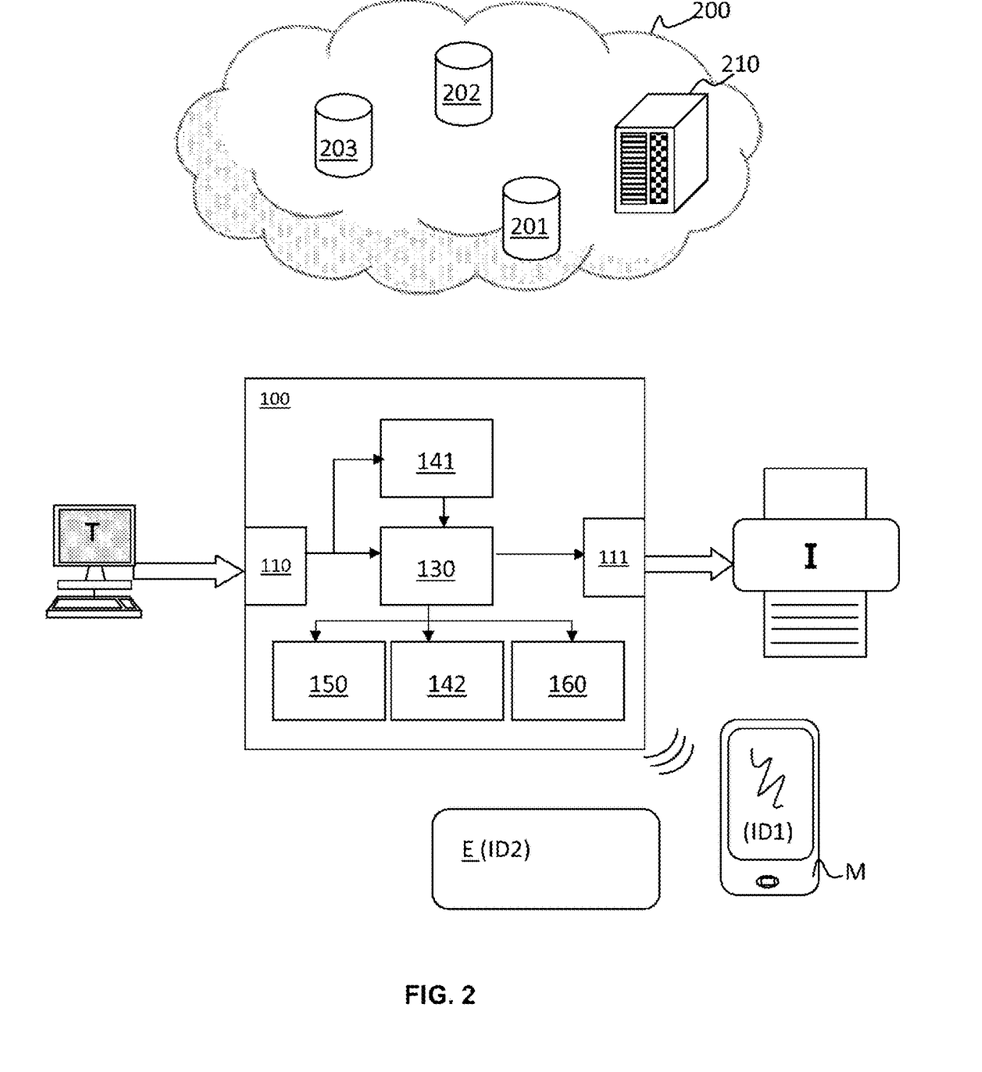
FIG. 2 shows a simplified synoptic diagram of a system for dematerializing receipts executing the device of FIG. 1.
Figure 3:
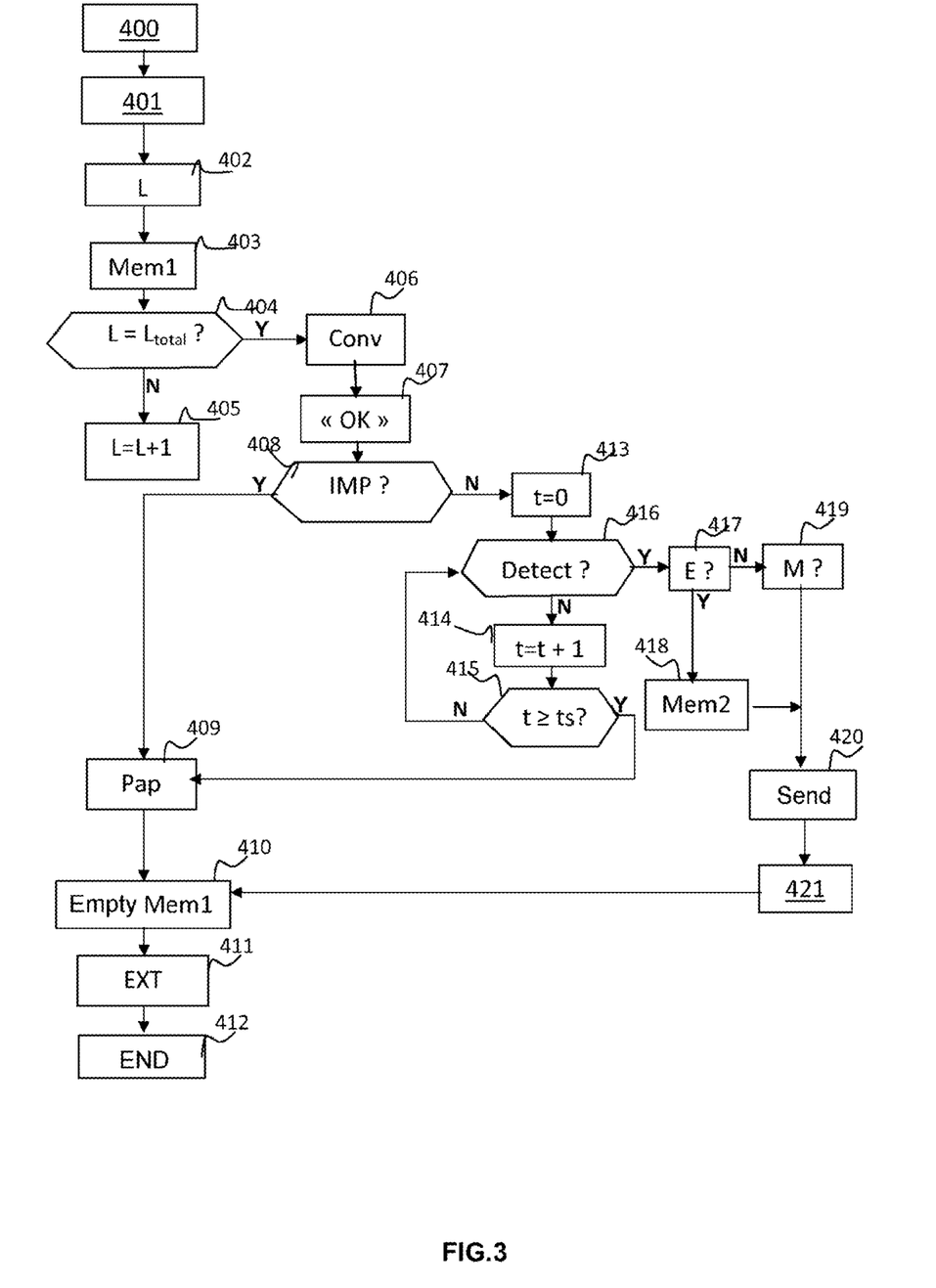
FIG. 3 shows a flowchart of the steps of a method for dematerializing receipts executed by the system of FIG. 2.

FIG. 2 illustrates a simplified synoptic diagram of a system for dematerializing receipts executing the dematerialization device 100 of FIG. 1 and a dedicated remote storage network 200 (cloud), accessible via a dedicated software application loaded in a mobile terminal M or via the Internet. FIG. 3 per se illustrates a flowchart of the steps of the dematerialization method executed by the system, from conversion of the data representative of the receipt by the dematerialization device 100 to storage of the digital receipt issued and transferred to the remote storage network 200. For the sake of a simplified description, these two figures are described simultaneously.

The dematerialization device 100 comprises two connection ports intended to connect both the POS terminal T and the printer I. These two ports, referenced respectively 110 and 111 in FIG. 2, may for example be materialized by USB ports (acronym for "Universal Serial Bus") or any other equivalent port.

The dematerialization device 100 is seen as a slave for the POS terminal T which sends it the order to print the receipt, but it is seen as a master for the printer to which it transmits a print order. As a consequence, so that its operating system may interact with the POS terminal T and with the printer I, the dematerialization device 100 advantageously comprises a controller known by the name of USB OTG controller (from the acronym "On The Go"), not shown in the figures, for managing the USB connections to exchange data as slave or master in the same session according to exchanging the data respectively with the POS terminal T or with the printer I.

A programming interface, comprising a microcontroller, referenced 130 in FIG. 2, runs computer programs for executing the different steps of the method for dematerializing receipts according to the invention, such as described hereinbelow.

By way of advantage, the dematerialization device 100 further comprises first storage means 141. These storage means 141 are preferably temporary and may materialize a non-volatile cache or random access memory (RAM) such that there is no risk of losing the stored data in the event of power cut, for example. This first storage means 141 temporarily records the data representative of the receipt, issued by the POS terminal T, as long as the corresponding receipt has not been transferred to a remote storage network 200 or to the printer I to be printed on paper.

A first step 400 consists of starting printing. When the different items bought by a customer are scanned at checkout, the POS terminal T records the data of each article, i.e., its name, its price etc. . . . . . The POS terminal T generates a line L of data per item to set up the receipt.

The generated data, representative of the receipt, are addressed to the dematerialization device 100. The dematerialization device 100 then transmits a wait message to the customer (step 401) as long as all the data representative of the receipt have not been received and have not been converted. The wait message may for example be materialized by a message displayed on the screen 101 and/or by actuating a steady or blinking indicator light, such as a red LED for example, referenced 102 in FIG. 1.

As the data representative of the receipt are progressively received, i.e., the different print lines L, L=L+1 etc. . . . (steps 402 and 405), these data are duplicated (step 403) in the first temporary storage means referenced 141.

To be able to transmit the data representative of the receipt to a mobile terminal M, via a short-range contactless communication protocol, the received data coming from the POS terminal T have to be converted into a digital file representative of the receipt and compatible with the contactless communication protocol. Therefore, the dematerialization device 100 further comprises a conversion module referenced 150 in FIG. 2.

When all the data representative of the receipt is received (step 404—L=$L_{total}$), the conversion module 150, then converts (step 406—CONV) the data into a digital file representative of the receipt. This conversion may be done simultaneously or following their duplication in the first temporary storage means 141.

When the data representative of the receipt is converted into a digital file, the digital receipt is then ready to be transferred. The device transmits a message to the customer (step 407—"OK") according to which the receipt is ready to be transmitted. This message may be materialized for example by a message displayed on the screen 101 and/or by extinction of the first indicator light 102 activated earlier, and simultaneous or almost simultaneous actuation of a second indicator light, steady or blinking, of a color different to the first, such as a green LED for example, referenced 103 in FIG. 1.

In step 408, the dematerialization device 100 detects the choice of the customer. In fact, the customer has the choice of asking for printing of the receipt on paper or else transfer of the receipt to the remote storage network 200. In this way, if the customer has no mobile terminal M with him/her, or if he/she has not loaded it with the software application dedicated in his/her mobile terminal M, and he/she is no longer registered with the dematerialization service via an identification number which has been attributed to him/her completely anonymously by means of a communicating object different to the mobile terminal M for example, so he/she requests printing of the receipt on paper. For this, the customer presses the button, referenced 105 in FIG. 1, to actuate the print command to the printer I and the receipt is printed on paper in step 409 (Pap).

If, however, the customer does not press the button 105 to actuate the print command, in step 408, a time-out is triggered (steps 413, 414, 415) so that the customer may present his/her mobile terminal M or any other communicating object, of electronic tag type, also called "tag" in the following description, capable of communicating with the dematerialization device 100 according to the short-range contactless communication protocol.

The customer must therefore present a communicating object, such as a mobile terminal M equipped with the dedicated software application or an electronic tag E, for example, in a preset time period so that the digital receipt may be associated with a unique identification number (ID1; ID2). This maximum time period, noted "ts" in FIG. 3 (step 415), is preset on installation of the device 100, and is for example between 10 and 20 seconds.

If no communicating object, whether a mobile terminal M or an electronic tag E, capable of exchanging data with the dematerialization device 100, is detected in the field of the dematerialization device 100 on expiration of the preset time period ts, the dematerialization device 100 automatically sends a print order to the printer I to which it is connected (step 409). The print command then includes the data representative of the receipt, generated and issued by the POS terminal T, and stored in the first temporary storage means 141 of the device. The corresponding receipt is printed conventionally, on paper.

Following printing on paper of the receipt in step 409, the method moves directly to step 410 (Empty Mem1), of emptying the contents of the first storage means 141, extinguishing the indicator light 103 previously activated and/or extinguishing the display of the screen (step 411—EXT). Then the dematerialization device 100 is placed awaiting (step 412—END) for the next receipt to be processed.

As mentioned hereinabove and particularly advantageously, the dematerialization device 100 may detect objects other than a mobile terminal M equipped with the software application dedicated to the dematerialization of receipt and connected, via the mobile telephone network, to the remote storage network 200. It may in fact detect the presence of other communicating objects, such as for example the presence of an electronic tag E capable of exchanging data with it according to a short-range wireless communications protocol, preferably of NFC type. This tag E, also called "tag" in the following of the description, is advantageously equipped with a chip containing a unique identification number ID2. This electronic tag may be integrated into any physical medium such as for example a card, a bracelet or a keychain etc. . . . . In this way, a customer without a mobile terminal M, or not wanting to load the dedicated software application on his/her mobile terminal, may subscribe to the dematerialization service through this tag E.

The manager of the dematerialization service and of the dedicated remote storage network 200, may in fact distribute such communicating objects E comprising an RFID chip, for example, readable by the dematerialization device 100 according to the short-range contactless communication protocol. Each communicating object E bears a unique identification number ID2. This unique identifier ID2 may be readable by the customer or be for example in the form of a QR code readable by a compatible reader equipping a mobile terminal for example, or in the form of a three-dimensional code readable by the camera of a computer. For security reasons, if the number inscribed on the portable object is readable by the human eye, it may be removed by scratching for example, or the number may be inscribed on a medium detachable from the object E so it may be destroyed. The customer in fact has no need to keep this identification number ID2, but only a pseudonym and/or a password of his/her choice. The RFID chip of such a communicating object E further comprises this same unique identification number ID2.

The customer in possession of such an object may register on the web site of the manager of the remote storage network 200, hosted by a server 210, by selecting a pseudonym and/or a password for example, and he/she registers on this web site by entering the identifier ID2 inscribed on the object which may be transmitted via the keyboard of his/her computer or his/her mobile terminal, or the camera of his/her computer or his/her mobile terminal. The customer may then fill one or more e-mail addresses, also called "email addresses" in the description below, on which he/she wants to collect receipts. So, the identification number ID2 attributed to him/her may be associated with his/her email address. At no step of registration, the customer is obliged to inform his/her name. The registration may therefore be done fully anonymously.

After registering anonymously on the server of the manager of the dematerialized service for receipts, the customer may present his/her communicating object E in the communication field of the dematerialization device 100.

Therefore, when a customer buys an item if he/she wants to receive a dematerialized receipt, but he does not have the application on his/her mobile terminal M, or he does not have a mobile terminal M, he/she may present this communicating object E to the dematerialization device 100.

If, at step 416 ("detect"), the dematerialization device 100 detects the presence of a communicating object with which it may communicate via the short-range contactless communication protocol (for example NFC), it then determines what object it is and especially if it is a mobile terminal M suitable for accessing the remote storage network 200 via a dedicated software application and the mobile telephone network or else a tag E. This determination may be done advantageously via the nature of the communicating object, detected by the device. Either the device 100 detects a tag E and in this case the dematerialization device 100 performs a tag-reading operation, or the device 100 detects a mobile terminal M requesting communication of NFC type in peer-to-peer mode and in this case the dematerialization device 100 will communicate with the mobile terminal M suitable for accessing the remote storage network 200 via a dedicated software application and the mobile telephone network.

The device 100 then attaches the identification number ID1 or ID2 which it has just read to the generated digital receipt.

When the dematerialization device 100 detects the presence of a tag E (step 417) and not that of a mobile terminal M, the dematerialization device 100 knows that the receipt cannot be transmitted immediately to the remote storage network 200, as the electronic tag E cannot connect to the remote storage network (cloud). The device 100 then registers the receipt attached to its identification number ID2, in a second temporary storage means 142, of non-volatile RAM type, for example (step 418—Mem2).

The receipt now stored in this storage means 142 is then placed awaiting transfer until the dematerialization device 100 detects the presence of a mobile terminal M equipped with the dedicated software application.

After storage of the digital receipt awaiting transfer in the second storage means 142 (step 418), the dematerialization method moves to the following step 410 of cleaning and emptying the first storage means 141, extinguishing the display of the screen 101 and/or the indicator light 103 (step 411—EXT) and placing the dematerialization device 100 awaiting processing another receipt (step 412—END).

When the dematerialization device 100 detects the presence of a mobile terminal M equipped with the dedicated software application (step 419), it attaches to the generated digital receipt the unique identifier ID1 associated with the software application of the mobile terminal M which it has just read. It then transmits (step 420—Send) the receipt attached to its identifier ID1 to the remote storage network 200 by means of the short-range contactless communication protocol, of NFC type, between the device 100 and the mobile terminal M, then via the software application connected to said remote storage network 200 by means of the mobile telephone network of the mobile terminal M. The device 100 preferably communicates with the terminal M by short-range contactless communication, and preferably by using the NFC protocol in peer-to-peer mode.

Highly advantageously, simultaneously with transfer of the receipt associated with the unique identifier ID1 of the software application of the mobile terminal M in communication with the device 100, the digital receipts generated previously from the detection of electronic tags E, and registered in the second storage means 142, are also transferred to the remote storage network 200 via the mobile terminal M which acts as a gateway. The customer owning the mobile terminal M cannot view the receipts now transferred because they are associated with the different identifiers ID2, IDi . . . IDx. They are therefore stored in different places on the remote storage network 200, corresponding to different customer accounts. Transfer of these receipts is therefore transparent relative to the customer owning the mobile terminal M. The data transiting via the mobile terminal M are then sent to a server 210 of the remote storage network 200, for processing and storage. The second storage means 142 is then emptied (step 421).

During transfer of the receipts to the remote storage network 200 via the mobile terminal M, the receipts are preferably transmitted encrypted to secure the data exchanged.

Once the receipt is printed (step 409—Pap) or else transferred by means of a mobile terminal M to the remote storage network 200 (steps 420 and 421), the first temporary storage means 141 of the device is emptied (step 410), the indicator lights 102, 103 extinguished and/or the screen 101 displays no message (step 411—EXT). The dematerialization device 100 is then placed awaiting (step 412—END) for the next print order When several receipts reach a server 210 of the remote storage network 200, each receipt being attached to a unique identifier ID1, ID2, IDi . . . IDx, a processing module, not shown, identifies the receipts, by way of the unique identification number which is attached to them, then separates them from each other to store them in a database 202 in which the receipts corresponding to each identification number are recorded. Another module, called mail module for example, not shown, then retrieves e-mail addresses associated with each unique identifier, and stored in a first database 201 for example, then sends the corresponding receipt for which said identification number has been allocated via the Internet to each identified email address, associated with an identification number.

The remote storage network 200 preferably comprises at least one server 210 hosting the web site of the manager of the storage network and accessible either via the dedicated software application equipping a mobile terminal M or via the Internet network.

Advantageously, the accounts corresponding to the identification numbers ID are anonymous. Attributed to unique identifier is a pseudonym and/or a password chosen by the customer during registration with the service by means of the software application or by means of the web site. When the customer wants to receive his/her receipts at one or more e-mail addresses, he/she may register this (these) address(es) any time by connecting to his/her account via his/her pseudonym and/or his/her password. The e-mail address will be registered is associated with a unique identifier. The remote storage network 200 may further comprise a first database 201, called for example "accounts database", in which the attributed unique identifiers are each associated with a pseudonym, a password and optionally one or more e-mail addresses. The storage network 200 may further include a second database 202, called for example "receipts database", in which all the receipts attached to each identifier are stored. Of course, the databases may also be combined into one.

The server 210 may further comprise or be connected to a module, not shown in FIG. 2, operating metadata of the receipts database 202, such that the data of each receipt stored are analyzed and interpreted. The consumption habits associated with each anonymous identifier ID may be recorded in a third database 203.

The fact of knowing the consumption habits associated with identifiers ID1, ID2, IDi . . . IDx may address promotional offers targeted to these identifiers, either by e-mail to the email address associated with the identifier, or to the software application associated with the identifier. Therefore, a digital discount coupon is for example generated and sent completely anonymously to the intention of a customer, as a function of his/her consumption habits. The discount coupon may either be printed on paper, or displayed on the screen of the mobile terminal M and scanned directly at the time of checkout when items are being bought.

According to a variant, it is also possible, for example to replace old obsolete printers, to link a printer directly to the dematerialization device 100.

When a check is to be printed by the printer I associated with the POS terminal T, a signal is sent with the data to be printed, the signal being representative of the print order of a check. In this case the dematerialization device 100 recognizes the print order of a check and transfers it directly to the printer I for printing.

The print order issued by the POS terminal T with the data representative of the receipt is always issued to the dematerialization device 100 after payment by the customer. As a consequence, when payment has been made by payment card, and the receipt representative of payment by payment card is intended to be printed by the printer I, it is also issued by the POS terminal T to the dematerialization device 100. In this case, the dematerialization device 100 transfers two receipts, one representing the purchase made and the other the payment mode by payment card.

By comparison, if the receipt representative of the payment by payment card must be printed by another specific printer and associated with the electronic payment terminal, also called by its acronym "EPT", a software version of the dematerialization device 100 could be implanted on the EPT. This software will take advantage of the NFC interfaces already present on the EPT to allow a mobile terminal M to retrieve its receipt representative of payment by payment card.

When these two receipts are transferred to a mobile terminal M, they may therefore both be classified differently, by way of the setting that the customer may carry out on his/her account, as a function of the classification mode he/she wants to use. The first, representative of the purchase made, may for example be stored in a folder titled "expense report" if the purchase corresponds to an expense made within the scope of work, or it may be put away in a folder titled "warranty" if the receipt acts as a warranty card, or quite simply in a folder titled "sales slips". The second receipt, per se, representative of the payment mode by payment card, may for example be classified in a folder titled "expenses". In each folder, the receipts may further be classified by date, for example.

It is also possible to provide that periodically, for example once per month, the server 210 of the remote storage network 200 sends the receipts of the past month, sorted in a particular folder, for example the "expense reports" folder or the "expenses" folder on a particular email address set as a function of the folder. So, for example expense reports could be sent via a professional email address, while expenses by payment card will be sent via a personal email address.

The device, the method and the dematerialization system which have just been described are particularly advantageous as they enable dematerialization of receipts in real time, when a customer passes through checkout, fully transparently for the checkout assistant who does not have to take any extra action. This solution needs no modification of the POS terminal which transfers the data conventionally to the dematerialization device 100 which it sees as a physical printer. The dematerialization device is simple and enables storage of digital receipts in a remote storage network accessible by the customer any time and from anywhere, via a dedicated software application loaded in his/her mobile terminal connected to a mobile telephone network or via internet. The customer is therefore certain to be able to find his/her receipts, and especially his/her warranty cards, his/her expense reports and more generally all the receipts allowing him/her to manage his/her accounts.

Also, storage of receipts is anonymous. The customer further needs only have his/her mobile terminal or a communicating object. He/she has no need to have as many cards or identification numbers as shops, restaurants or boutiques in which he/she buys products or services. The dematerialization system according to the invention is therefore also advantageously accessible to small boutiques or restaurants.

The invention claimed is:

1. A device (100) for dematerializing a receipt in real time, said device being connected between a point-of-sale (POS) terminal (T) giving it an order for printing data representative of said receipt, and a printer (I), so as to enable transfer of said print order of said data representative of the receipt to said printer (I), said device comprising a first storage means (141) of the data representative of the receipt issued by the POS terminal (T), a conversion module (150) suitable for converting said data representative of the receipt, coming from said POS terminal (T), into a digital file representative of said receipt, a contactless transmitting/receiving module (160) suitable for exchanging data with a communicating object (M, E), according to a contactless communication protocol, said communicating object being in the form of an electronic tag (E) or a mobile terminal (M), wherein the transmitting/receiving module (160) is suitable for transmitting one or more digital files generated by said conversion module (150), each file being associated with a unique identifier (ID1, ID2), to a remote storage network (200) accessible by means of a mobile telephone network of a mobile terminal (M), which acts as a gateway and with which said module (160) communicates according to said contactless communication protocol, and a second storage means (142) for recording one or more digital files, representative of one or more receipts, waiting to be transferred to said remote storage network (200), each digital file being attached to an identification number (ID2) transmitted by said communicating object (E) to said dematerialization device (100) according to said contactless communication protocol.

2. The device according to claim 1, further comprising an actuation button (105) of a print command on paper, to issue a print order of the data representative of the receipt, coming from said POS terminal (T), to the printer (I) which is connected to it.

3. The device according to claim 1, further comprising an on-board peripheral suitable for indicating the state of conversion of the data representative of the receipt into a digital file, said peripheral being selected from at least one of the following peripherals: a screen (101) and/or one or more indicator lights (102, 103).

4. A method for dematerializing a receipt issued by a POS terminal (T) to a dematerialization device (100) according to claim 1, the method comprising the following steps:
   transfer (403-405) of the data representative of the receipt, generated by the POS terminal (T), to said dematerialization device (100),
   conversion (406) of said transferred data into a digital file representative of said receipt,
   prior to or simultaneously with the conversion step (406), recording (403) said data representative of said receipt issued by the POS terminal (T) in a first storage means (141) of said dematerialization device (100),
   then:
   a1) detecting (416) the presence of a communicating object (M, E) with which the dematerialization device (100) may exchange data according to a contactless communication protocol, said communicating object being in the form of an electronic tag (E) or a mobile terminal (M),
   a2) reading, by the dematerialization device (100), of a unique identification number (ID1, ID2) transmitted by said communicating object,
   a3) associating said read identification number (ID1, ID2) with said generated digital file, and:
   when the said detected communicating object is a mobile terminal (T):
   a4) transferring said digital file representative of said receipt to a remote storage network (200) accessible by means of a mobile telephone network of a mobile terminal (M), which acts as a gateway and with which said device communicates according to said contactless communication protocol;
   when the said detected communicating object is an electronic tag (E):
   a5) recording (418) said digital file associated with said identification number (ID2) transmitted by said electronic tag (E) in a second storage means (142), while waiting for its transfer at the time of subsequent detection (419) of the presence of a mobile terminal (M), suitable for accessing said remote storage network (200) by means of its mobile telephone network when an absence of detection of a communicating object and/or upon activation of a print command:

b) transferring said data representative of said receipt coming from said POS terminal (T) to a printer (I) connected to said dematerialization device (100) for printing (409) said receipt on paper.

5. The method according to claim 4, wherein the contactless communication protocol is the NFC protocol.

6. The method according to claim 4, wherein when several digital files are transferred from said second storage means (142) to the remote storage network (200), by means of the mobile telephone network of a mobile terminal (M), which acts as a gateway and with which said device (100) communicates according to said contactless communication protocol, a server (210) of said remote storage network (200) identifies them by way of their associated identification number (ID1, ID2), separates them and stores them in a database (202).

7. The method according to claim 4, further comprising incrementation of a time-out (413-415) until a predetermined maximum duration (ts), on expiration of which, when the dematerialization device (100) detects no presence of a communicating object (M, E) for reading the identification number (ID1, ID2) to be attached to the generated digital file, it sends a print command to the printer (I) to print the receipt on paper.

8. A dematerialization system, comprising:
a dematerialization device (100) according to claim 1, suitable for converting data representative of a receipt, issued by a POS terminal (T), into a digital file representative of said receipt,
a remote storage network (200) accessible by means of a mobile telephone network of a mobile terminal (M), which acts as a gateway and with which said dematerialization device (100) communicates according to a contactless communication protocol, to transfer said generated digital file to said remote storage network (200).

9. The system according to claim 8, wherein the remote storage network (200) comprises a server (210) connected to one or more databases (201, 202) capable of storing unique identification numbers (ID1, ID2) attributed to anonymous users, and digital files representative of receipts, each file being associated with an identification number (ID1, ID2).

10. The system according to claim 9, wherein the database(s) further store one or more e-mail addresses associated with an identification number.

11. The system according to claim 8, wherein the remote storage network (200) further comprises a module operating the data stored in the database(s) (201, 202), to analyze the consumption habits associated with each unique identifier (ID1, ID2) and allow the issuance of targeted offers, as a function of said consumption habits, to said identification numbers, said offers being viewed on the screen of a mobile terminal loaded with a dedicated software application associated with said identification number (ID1) and/or sent via e-mail, when an e-mail address is associated with said identification number (ID1, ID2).

* * * * *